Patented Oct. 8, 1940

2,217,372

UNITED STATES PATENT OFFICE 2,217,372

UREA-FORMALDEHYDE RESINS

Oskar R. Ludwig, Philadelphia, Pa., assignor to The Resinous Products & Chemical Company, Philadelphia, Pa.

No Drawing. Application August 13, 1936, Serial No. 95,845

3 Claims. (Cl. 260—70)

This invention relates to improved paint, varnish and lacquer resins of the urea-formaldehyde type, and to resin and coating compositions embodying such resins with other natural or synthetic resins or other paint, varnish or lacquer ingredients. It also pertains to the process of preparing said urea-formaldehyde resins.

The condensation of urea and formaldehyde is a well known but little understood chemical reaction. The initial reaction between the two is a simple addition of one or two molecules of formaldehyde to each molecule of urea to form methylol derivatives of urea. On heating at the proper pH these compounds split out water and pass through intermediate stages of condensation until an insoluble, infusible, relatively inert resin is formed. The commercial utilization of urea and formaldehyde condensation products has been materially hampered by an inability to adequately control condensation in the intermediate, soluble stages and stop it at a desirable point. The reaction tends to continue to the insoluble stage even at room temperatures.

One proposal (Lauter U. S. Patent 1,633,337) for controlling the reaction and producing a soluble resin, usable as a base for coating compositions, is to carry out the condensation in a nonaqueous organic solvent, preferably an alcohol, and to neutralize the catalyst used when the desired condensation is reached. A second proposal modifies this process by using the methylol derivatives of urea as starting materials. Resins thus formed are soluble in many organic solvents but are of limited practical value because of their instability. In order to be widely used as coating materials, the resin must remain clear, soluble, and constant in viscosity. An unstable resin, one that continues to react in the cold, changes in its solubility and viscosity and becomes cloudy in appearance.

The object of the present invention is to prepare stable, soluble condensation products of urea and formaldehyde that are suitable for use in coating compositions.

The instability of the previously existing ureaformaldehyde resins of the type soluble in paint, varnish and lacquer solvents is apparently dependent upon the ratio of urea to formaldehyde used, but more especially upon the presence of water formed during condensation and of varying amounts of catalysts remaining in the finished resin.

It is therefore a further object of this invention to develop a process of condensing urea and formaldehyde that will give a product free of water and all catalytic materials.

In general, the process of this invention comprises condensing urea and formaldehyde in the absence of water and in the presence of a volatile alcoholic solvent and a very small amount of a volatile acid catalyst, by heating the reaction mixture for a relatively long time (10 to 15 hours) under such conditions that the catalyst and water split out during condensation are volatilized and distilled out of the reaction mixture as the condensation proceeds.

For the successful carrying out of the process, it is necessary to employ a volatile catalyst; that is, one that itself boils at a temperature below 120° C. or one which by chemical reaction during condensation, forms a compound such as an ester that will volatilize at such temperatures. The actual amount of catalyst to be used will vary, depending upon its acidity and catalytic strength, but it is essential that only such quantities be added as will produce but a mild catalyzing effect. To completely react urea and formaldehyde to obtain the desired, hydrocarbon soluble resin, heating at a temperature above the boiling point of water for periods as long as from 10 to 15 hours is necessary. Unless a very small amount of catalyst is used, a lengthy heat treatment at such temperatures would gel the resin and render it unfit for coating compositions. With formic acid, which is the preferred catalyst, the optimum amount has been found to be 0.06% based on the total weight of starting materials (urea, formaldehyde and alcohol). A maximum of 0.1% can be used. With hydrochloric acid, a stronger acid, the optimum amount was found to be 0.003%, with the maximum permissible between 0.004% and 0.005%. With acetic acid it was found that in the neighborhood of 1.5% is needed. In general, it can be said that the amount of catalyst that can be used is that quantity which will not cause gelling of the resin when the reaction mixture is heated to the boiling temperature of n-butyl alcohol, 117° C., over a period of approximately ten hours. For best results the acid catalyst is not added until after some reaction has taken place, and preferably it should not be added until the reaction mass has reached the methylol urea stage. At the beginning of condensation the reaction mass is preferably neutral or slightly alkaline.

The reaction is best carried out under atmospheric pressure and at the boiling point of the mixture. It is therefore desirable to use as the solvent an alcohol that boils near the boiling point of water, preferably between 100° and 120° C. The butyl alcohols, particularly n-butyl alcohol, is preferred, but ethyl, propyl and the amyl alcohols under suitable conditions, can be used. Methyl alcohol is too low boiling to be practical. With ethyl and the propyl alcohols, the reaction is somewhat slow because of their low boiling points, but this defect can be overcome by the use of pressure. The boiling point of n-amyl alcohol is dangerously near the decomposition temperature of urea formaldehyde resins, but with caution and the use of vacuum, it can be used. With alcoholic solvents boiling between about 78° C. and 137° C., the process can be carried out at the boiling temperature of the mixture. When higher boiling alcohols are used, the temperatures must be kept below their boiling points, preferably below 120° C., and some other means, such as passing an inert gas through the reacting mixture, can be used to assist the removal of water as rapidly as formed. When using alcohols such as cyclohexanol and the mono ethers of ethylene or diethylene glycol, some means such as blowing should be used to insure the rapid and complete removal of the water.

While the reaction may be applied to urea and formaldehyde used in a ratio of one mol of urea to two mols of formaldehyde, an excess of formaldehyde is desired, in order to obtain more stable, clear condensation products. Preferably 2.5 mols of formaldehyde to one mol of urea are used. In place of urea and formaldehyde as starting materials, an initial addition product, dimethylol urea, to which additional formaldehyde may be added if desired, may be employed. In carrying out the process the following procedure is recommended:

An alcoholic solution of formaldehyde, which may be prepared by dissolving formaldehyde vapors or paraformaldehyde in alcohol and to which a small amount of hexamethylenetetramine or ammonia may be added, is heated and the proper amount of urea added and rapidly dissolved by stirring. A clear solution is first obtained which becomes turbid on further heating and shortly afterwards becomes clear again. Care should be taken at this stage that the exothermic heat of reaction is not permitted to greatly raise the temperature. After the reaction reaches its second clear stage, the proper amount of volatile catalyst is added. Heating is continued and the mixture distilled to remove water formed during the reaction, together with part of the solvent which, however, is replaced by the same amount of anhydrous solvent. An advantage of using n-butanol as solvent is that it forms a constant boiling mixture with water which separates upon cooling whereby the distilled butanol can be readily separated from the water and returned to the reaction mass. The course of the condensation can be followed by measuring the amount of water that distills out. The reaction is completed when about two mols of water have been removed for one mol of urea reacted. Under the conditions herein described this will require heating for from approximately ten to fifteen hours, although in some instances shorter heating periods can be used. The following example is given to illustrate the invention. It should be understood that it is not to be construed as a limitation thereon.

*Example*—To 100 pounds of a 40% solution of formaldehyde in n-butanol, prepared by refluxing 60 pounds of butanol and 40 pounds of paraformaldehyde in the presence of about 0.8 pound of hexamethylenetetramine, 32 pounds of urea are added. Over a period of from 10 to 15 minutes the mixture is heated from about 25° C. to 80 or 90° C. During this time the urea dissolves in the butanol, but near the top temperature the mass becomes turbid. In about another 5 minutes the temperature is raised to about 90–95° C. and the solution clears. When the temperature reaches 100–103° C. (another 10 minutes approximately) the solution begins to boil. This temperature is maintained while refluxing for 15–30 minutes. 0.08 pound of formic acid is then added and distillation begun and continued as the temperature gradually rises to 115–117° C. Water formed during the reaction and part of the butanol are continuously distilled out of the reaction mixture and condensed, the water being collected and the butanol returned to the reaction mixture. When 19 pounds of water have been collected and one volume of the resin solution is miscible with about 7 to 8 volumes of xylol, removal of water and resinification are complete. Normally this will require a period of from 12 to 14 hours. The clear, neutral product obtained contains about 56% resin and is completely stable. A 50% resin solution in butanol has a relatively high viscosity (P–S according to the Gardner-Holdt scale). It is miscible with monohydric alcohols or the common esters in any ratio and is almost completely miscible with aromatic hydrocarbons; that is, with 16 parts of toluol or 10 parts xylol. It tolerates dilution with aliphatic hydrocarbons.

From this example and the information given above, it will be apparent to those skilled in the art how the process can be carried out with other volatile catalysts and other alcoholic solvents. It will also be apparent that the urea may be partially replaced by thiourea or other urea derivatives and that the formaldehyde may be substituted, partially, by other aldehydes, such as acetaldehyde and benzaldehyde. It will also be apparent that mixtures of alcoholic solvents may be used instead of a single alcohol.

The resin solutions prepared according to the present invention form hard, light-fast films, especially when subjected to elevated baking temperatures. They may be used by themselves in coating compositions or may be blended with other resins, particularly those formed from polyhydric alcohols (glycerol) and polybasic acids (phthalic) whether or not modified by drying oils (linseed) or non-drying oils (castor) or their fatty acids. Such coatings bake at relatively low temperatures (80° C.) to extremely hard, resistant, glossy films of excellent color retention.

The resin film hardens slowly at room temperature but rapidly at elevated temperature. Hardening can be accelerated by the addition of an acid catalyst just prior to application of the film. It is frequently necessary to plasticize the resin in order to overcome its brittleness. Common lacquer plasticizers such as raw or blown castor oil, the esters of phthalic acid (dibutyl phthalate), tricresyl phosphate, and sebacic acid esters, such as the glycerol and butyl esters, whether or not modified with the hereinbefore mentioned oils or their fatty acids, may be used. The fact that the new resin becomes very hard on baking and aging makes it very valuable as an ingredient in alkyd resin enamels and nitrocellulose or cellulose acetate lacquers, particularly when these enamels or lacquers are to be used as coatings for metal, as in automobile and refrigerator finishes. The resin may also be used as a binding material in molded or laminated resinous products and as an adhesive, as, for instance, in the preparation of plywood.

If, in the herein disclosed process a non-volatile catalyst that is neutralized and separated from the resin after the reaction is completed, is substituted for the volatile catalyst, the product obtained will be a substantial improvement over previously known resins. But it will not embody the complete stability that characterizes resins made with a volatile catalyst.

By the term "a volatile catalyst", as used in the following claims, is meant a catalyst which itself boils beneath about 120° C. or which under the conditions of reaction, forms a compound that boils at such temperature.

I claim:

1. The process of producing condensation products from urea and formaldehyde which comprises heating a non-acidic n-butanol solution of one molecular equivalent of urea and two and one half molecular equivalents of formaldehyde until the reaction has reached the methylol urea stage, adding to the solution about 0.06% of formic acid, distilling from the solution the water of reaction as it is formed and continuing the distillation until approximately two mols of water separate for each mol of urea condensed.

2. The process of producing condensation products from urea and formaldehyde which comprises heating a non-acidic n-butanol solution of one molecular equivalent of urea and at least two molecular equivalents of formaldehyde until the reaction has reached the methylol urea stage, adding to the solution not more than 0.1% of formic acid, distilling from the solution the water of reaction as it is formed and continuing the distillation until approximately two mols of water separate for each mol of urea condensed.

3. The process of producing condensation products from urea and formaldehyde which comprises heating a non-acidic solution of one molecular equivalent of urea and at least two molecular equivalents of formaldehyde in an alcoholic solvent having a boiling point between about 78° C. and 137° C. until the product has reached the methylol urea stage, adding to the solution not more than 0.1% of formic acid, distilling from the solution the water of reaction as it is formed, and continuing the distillation until approximately two mols of water separate for each mol of urea condensed.

OSKAR R. LUDWIG.